United States Patent [19]

Nelson et al.

[11] 4,357,398
[45] Nov. 2, 1982

[54] ELECTROCHEMICAL CELL HAVING CYLINDRICAL ELECTRODE ELEMENTS

[75] Inventors: Paul A. Nelson, Wheaton; Hiroshi Shimotake, Hinsdale, both of Ill.

[73] Assignee: The United States of America as represented by the United States Department of Energy, Washington, D.C.

[21] Appl. No.: 240,673

[22] Filed: Mar. 5, 1981

[51] Int. Cl.³ .................. H01M 2/26; H01M 6/44
[52] U.S. Cl. .................................. 429/94; 429/160; 429/161; 429/238
[58] Field of Search .............. 429/160, 161, 94, 238

[56] References Cited

U.S. PATENT DOCUMENTS

| | | | |
|---|---|---|---|
| 461,025 | 10/1891 | Lamb | 429/161 |
| 625,683 | 5/1899 | Julien | 429/161 |
| 2,177,235 | 10/1939 | Winckler | 429/160 |
| 3,384,513 | 5/1968 | McHenry | 429/238 |
| 3,811,955 | 5/1974 | Ralston | 429/94 |
| 3,846,175 | 11/1974 | Desai | 429/161 |
| 4,011,374 | 3/1977 | Kaun | 429/220 |
| 4,029,860 | 6/1977 | Vissers et al. | 429/122 |
| 4,086,396 | 4/1978 | Matehers | 429/103 |
| 4,110,517 | 8/1978 | Arntzen | 429/133 |
| 4,172,926 | 10/1979 | Shimotake | 429/112 |

FOREIGN PATENT DOCUMENTS 22125 8/1900 Switzerland ............... 429/149

*Primary Examiner*—Donald L. Walton
*Attorney, Agent, or Firm*—Hugh W. Glenn; Robert J. Fisher; Richard G. Besha

[57] ABSTRACT

A secondary, high temperature electrochemical cell especially adapted for lithium alloy negative electrodes, transition metal chalcogenide positive electrodes and alkali metal halide or alkaline earth metal halide electrolyte is disclosed. The cell is held within an elongated cylindrical container in which one of the active materials is filled around the outside surfaces of a plurality of perforate tubular current collectors along the length of the container. Each of the current collector tubes contain a concentric tubular layer of electrically insulative ceramic as an interelectrode separator. The active material of opposite polarity in elongated pin shape is positioned longitudinally within the separator layer. A second electrically conductive tube with perforate walls can be swagged or otherwise bonded to the outer surface of the pin as a current collector and the electrically insulative ceramic layer can be coated or otherwise layered onto the outer surface of this second current collector. Alternatively, the central pin electrode can include an axial core as a current collector.

12 Claims, 4 Drawing Figures

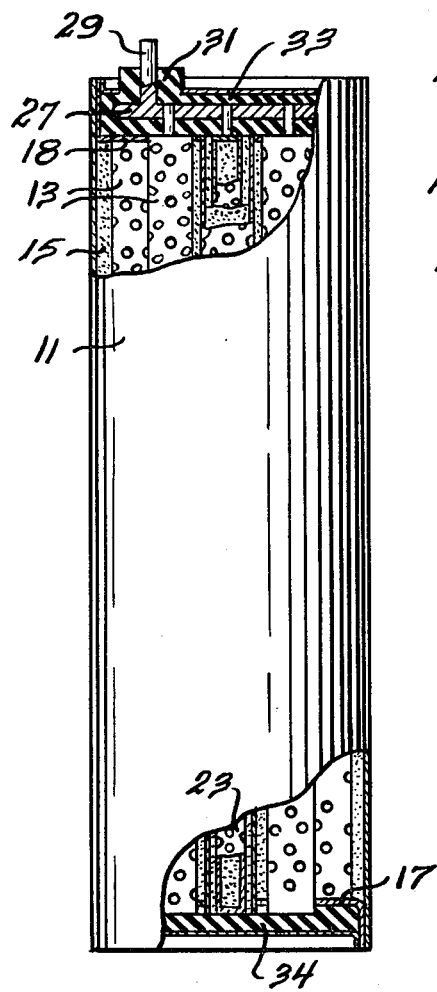
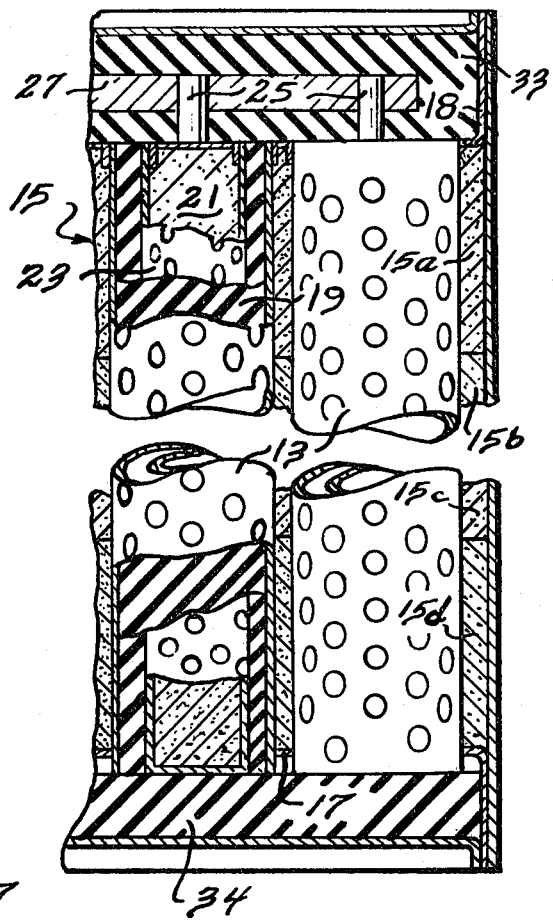
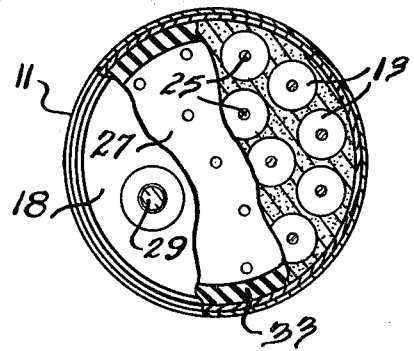
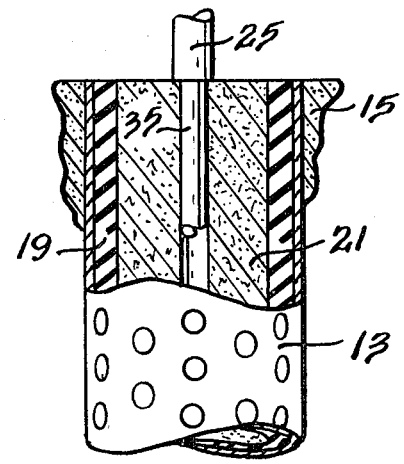

ELECTROCHEMICAL CELL HAVING CYLINDRICAL ELECTRODE ELEMENTS

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to high temperature secondary electrochemical cells and batteries of such cells that can be used as power sources for electric vehicles, storage of off-peak power production and various other applications.

There has been a substantial amount of work in the development of such high temperature, high power electrochemical cells and their electrodes. One group of such cells that show promise include alkali metals or alkaline earth metals and their alloys with more inert materials as negative electrodes. In the positive electrodes of such cells chalogens and transition metal chalogenides are contemplated as active materials. Typical examples include lithium, sodium or calcium and alloys of these active materials with more inert elements such as aluminum, magnesium silicon or boron as a negative electrode materials. In the positive electrode, transition metal sulfides such as iron sulfide, cobalt sulfide, copper sulfide, nickel sulfide and others have been of particular interest. Electrolytes of alkali metal halides and alkaline earth metal halides are typically used in these cells.

High temperature electrochemical cells of these types are illustrated in the following patents:

Artzen, U.S. Pat. No. 4,110,517 shows an electrochemical cell design that employs frangible forms of ceramic materials as electrically insulative cell separators.

Vissers et al, U.S. Pat. No. 4,029,860 illustrates a compartmented or honeycomb structure used as a current collector to support electrochemically active material within an electrode.

Kaun et al., U.S. Pat. No. 4,011,374 describes the use of a resin into which various electrochemically active materials are blended for preparing electrodes.

Mathers et al., U.S. Pat. No. 4,086,396 describes the use of powdered electrically insulative ceramics as separators between electrodes of opposite polarity.

Shimotake et al., U.S. Pat. No. 4,172,926 discloses a secondary electrochemical cell design in which various active material forms suitable for use in high temperature, high specific energy electrochemical cells are described.

Previous secondary electrochemical cells under development have contained flat plate-type electrodes within prismatic or cylindrical housings. Electrically conductive current collectors have extended throughout the flat plate design to be accessible to the active material within the cell. Electrically insulative separator material has extended over and around both flat surfaces between electrodes and over the edge surfaces facing the cell housing. The cells of prismatic shape, although conveniently packed within a battery housing, contain less volume per unit wall area than comparable cylindrical structures, consequently they generally exhibit an increased weight per unit of energy storage capacity. Such flat plate electrode structures are generally prepared by pressing operations that require separate loading and pressing steps for each electrode or electrode separator member.

Previous cylindrical cells have included central pin electrodes of for instance lithium aluminum alloy and an annular electrode of for instance FeS surrounding the central pin. A porous ceramic separator of electrically insulative material is positioned between the electrodes. Cells of this type have the shortcomings of small cell capacity and limited power capability. Increased electrode diameters and thicknesses to increase capacity decreases interelectrode surface and thus power for a given weight. Alternatively, the use of very elongated or a large number of small diameter cells presents cumbersome packaging and connection problems.

Therefore, in view of the foregoing electrochemical cell designs and procedures it is an object of the present invention to provide an improved electrochemical cell with electrodes of cylindrical design.

It is a further object to provide an electrochemical design in which use of electrically insulative separator material is in general restricted to between electrode surfaces of opposite polarity.

It is a further object of the present invention to provide an electrochemical cell containing a plurality of electrode elements of tubular or pin shape to permit their fabrication by extrusion and other continuous processes.

SUMMARY OF THE INVENTION

In accordance with the present invention, an electrochemical cell is provided that includes an elongated electrically conductive cell container in electrical communication with a first electrochemically active material. A plurality of first electrically conductive tubes with perforate walls serving as current collectors are affixed lengthwise each along one of a plurality of separate substantially parallel axes within the cell container in electrical communication with the container and the first active material. Each of the perforate tubes includes a tubular layer of electrically insulative ceramic concentrically disposed within its inner circumference. Concentrically and lengthwise within the electrically insulative tubular layers and perforate tubes are elongated pins of a second active material of opposite polarity to the first active material. The cell further includes electrical terminal means for electrically communicating separately with the first and the second active materials.

In more specific aspects of the invention, the electrochemical cell container is of cylindrical shape and substantially filled in its volume outside the plurality of first electrically conductive tubes with the first active material. In one other important aspect, particularly for electrochemical cells including active materials such as FeS and LiAl alloy that are compatible with low carbon steel and other less expensive current collector materials, there is provided a second perforate tube of electrically conductive material between the electrically insulative tubular layer and the axial electrode pin. In this arrangement the second electrically conductive tube can be bonded onto the outside surface of the electrode pin.

In one other more specific embodiment of the invention, the elongated cylindrical pin of electrochemically active material can include a longitudinal core of electrically conductive material serving as a current collector. An axial current collector of this form can be used in place of the inner perforate tube discussed above when more electrochemically corrosive active materials such as FeS$_2$ are selected for use in the cylindrical pin electrode. This active material can be retained within the remaining perforate tube but separated from it by the tubular layer of electrically insulative ceramic.

A further important embodiment of this invention includes solid disk shaped layers having circular openings through the thickness thereof adapted to snuggly nest and stack around each of the plurality of first electrically conductive tubes. The solid disk shaped layers are of the first electrochemically active material. Other specific forms of the first electrochemically active material include granular material such as transition metal chalogenide vibrated into the open volume intermediate, the individual electrically conductive tubes affixed within the cell container. In one other form the first electrochemically active material can include a solidified melt of alkali metal or alkaline earth metal, halides uniformly containing a granular transition metal chalogenide within the volume outside the first electrically conductive tubes affixed within the cell container.

BRIEF DESCRIPTION OF THE DRAWINGS

The present invention is illustrated in the accompanying drawings wherein:

FIG. 1 is an elevation view partially broken away of a cylindrical electrochemical cell.

FIG. 2 is a top view partially broken away of the electrochemical cell of FIG. 1.

FIG. 3 is an enlarged fragmentary view of the upper and lower portions of electrodes partially broken away in the electrochemical cell of FIG. 1.

FIG. 4 is a fragmentary view partially broken away of an alternate electrode form.

DETAILED DESCRIPTION OF THE PREFERRED EMBODIMENT

FIGS. 1 and 2 of the drawings illustrate an elongated electrochemical cell within a cylindrical shaped container 11. Within the cell container are a plurality of first electrically conductive tubes 13 of perforate material containing electrodes of a common polarity extending lengthwise within the cell container.

Although both the container and the tubes are illustrated of circular cross-section as a preferred embodiment, it will be clear that various other shapes may also be selected for use. For instance, the container and tubes need not be of the same shape in cross-section as tubes 13 can be affixed into a container having various polygonal (i.e. hexagonal or octagonal) cross-sections. Alternately the first electrically conductive tubes 13 can be elongated hollow members with polygonal cross-sections within the container of various cross-sections. However, for purposes of the present application tubes and containers of the preferred circular cross-sections are illustrated and discussed.

A first electrochemically active material 15 is filled within the void volume within cell container 11 around the first electrically conductive perforate tubes 13. Tubes 13 are therefore at the same polarity and serve as current collectors for the first active material 15. These tubes can be of perforated metal as shown or of metal mesh, screen, expanded metal and other like perforate construction. To ensure adequate support and electrical contact between electrically conductive tubes 13 and cell container 11, an electrically conductive member or perforated disk 17 is metallurgically bonded or otherwise firmly affixed by known means to the bottom portion of the electrically conductive tubes 13 and to the cell container 11. Member 17 thereby provides physical support for the electrically conductive tubes 13 and good electrical contact between tubes 13 and the cell container. A similar disk or member 18 can be installed at the top portion of the cell. Since perforate electrically conductive tubes 13 act as current collector for the active electrode material 15, and are as described in firm electrical communication with cell container 11, cell container 11 can be adapted to serve as a terminal of like polarity to that of electrochemically active material 15.

Considering FIG. 3 in conjunction with the other Figures, the manner in which the electrode components within the electrically conductive tubes 13 are discussed and illustrated. A tubular layer 19 of electrically insulative ceramic is shown on the inner surface of electrically conductive tube 13. Tubular layer 19 acts as an interelectrode separator between electrochemically active material 15 and an elongated cylinder or pin of electrochemically active material 21 of opposite polarity. The separator 19 may be in various forms such as felt, fabric, cloth, paste or powdered material. Well known materials such as magnesium oxide, aluminum nitride, calcium sulfide, yttria and boron nitride are examples of suitable electrically insulative ceramics that can be selected. Mixtures of materials or forms can be used. For instance, MgO powder and possibly binders can be filled into boron nitride felt and the composite pressed into a compact separator form.

A second perforate tube 23 is illustrated around the pin of electrochemically active material 21. Tube 23 serves as an electrically conductive current collector in contact with active material 21. The ends of current collector tube 23 are capped and the top portion is formed into electrical communication with the electrode terminal 25 axially extending from the top cap. A terminal disk or other suitable type electrical connection bus 27 interconnects each of the electrode terminals 25 and electrically communicates with a cell terminal 29 corresponding to the polarity of electrochemically active material 21. Terminal 29 is illustrated extending through but insulated from the top wall of container 11 by electrical feedthrough 31. Electrically insulative layers 33 and 34 are positioned at the top and the bottom of the cell container 11 to electrically separate electrode components associated with active material 21 from the cell container.

In FIG. 4, an alternate pin construction is illustrated in which the inner electrically conductive current collector (perforate tube 23 in FIG. 3) is replaced with an axial core 35 of electrically conductive material in electrical contact with electrochemically active material 21. Core 35 is made integral with or bonded, attached or otherwise electrically coupled to electrode terminal 25. This form of electrode pin is particularly suitable when materials such as iron disulfide is used as active material and require high cost current collector materials such as molybdenum to resist corrosion.

The electrochemical cells described and illustrated can include either the positive or the negative electrochemically active material in either of the locations designated for the active materials 15 and 21. However, in certain cells one or other of the arrangements may be more advantageous. For instance, in a lithium aluminum alloy-FeS cell the lithium aluminum alloy can advantageously be extruded into a continuous rod and cut into appropriate lengths as illustrated at pin electrodes 21. A steel perforate tube illustrated at 23 can be swagged or otherwise bonded to the outside of the lithium aluminum electrode pin. The ceramic separator material 19 can be applied to the outside surfaces of tube 23 by known techniques such as high temperature spraying, coating in mixture with an organic binder which is later removed or wrapping as a felt or cloth around the outer surface.

In a cell of this arrangement, the current collectors 13 for the FeS electrochemically active material can be welded, bonded or otherwise affixed in electrical communication with cell container 11 in readiness for receiving the prefabricated assemblies of active material pins 21, current collector tubes 23 and separator material 19. After positioning these electrode assemblies containing active material 21 in tubes 13, the positive electrode material 15 and electrolyte, such as LiCl-KCl, can be filled into the cell volume around current collector tubes 13. The electrolyte and active material mixture can be vibrated in powdered form or poured as a paste or slurry into that volume. In one other procedure, solid disks of positive electrode material 15 and electrolyte (illustrated as 15a, 15b, 15c and 15d in FIG. 3) can be prepared with circular openings corresponding to the outside diameters of current collector tubes 13. The disks are then stacked in place during the assembling of the cell prior to installing the upper cell components.

It is therefore seen that the present invention provides an electrochemical cell in which the container current collectors and interelectrode separators are effectively and economically used. The cylindrical cell container provides the advantages of less outside wall area per unit cell volume and thus potential for a reduced cell weight but without sacrificing interelectrode surface. The use of a plurality of tubular electrodes within a cylindrical cell container provides economies in separator and current collector use. The cell design is also appropriate for employing extrusion and other continuous processes in the fabrication of cell components to facilitate cell construction and assembly.

Although the present invention is described in terms of specific embodiments, it will be clear that various changes and modifications can be made in the materials, structure and process steps within the scope of the following claims.

The embodiments of this invention in which an exclusive property or privilege is claimed are defined as follows:

1. A high temperature electrochemical cell including a transition metal chalcogenide and a solid lithium alloy as electrochemically active materials within a cylindrical, electrically conductive cell container comprising:

an electrode of first polarity including a plurality of first electrically conductive tubes with perforate walls affixed lengthwise each along one of a plurality of separate substantially parallel axes within said cell container and a first of said electrochemically active materials of first polarity along with an electrolytic metal halide salt substantially filling said cell container outside said first electrically conductive tubes;

a plurality of electrodes of opposite polarity to said first polarity disposed one each lengthwise within but spaced from the walls of said first tubes, each electrode of opposite polarity including said electrochemically active material of opposite polarity to said first material and electrically conductive means for collecting current from said electrodes of opposite polarity;

a plurality of electrically insulative tubular layers disposed one each within said first electrically conductive tubes between the walls thereof and each of said electrodes of opposite polarity; and electrical terminal means for electrically communicating with said electrode of first polarity and with said plurality of electrodes of opposite polarity whereby electrical energy can be accumulated into and withdrawn from said electrochemical cell.

2. The electrochemical cell of claim 1 wherein said first electrically conductive tubes are in electrical contact with the walls of said electrically conductive cell container.

3. The electrochemical cell of claim 1 wherein said insulative tubular layers are of a material selected from the group of electrically insulative ceramics consisting of boron nitride, magnesium oxide, calcium sulfide, yttrium oxide, aluminum nitride and mixtures thereof.

4. The electrochemical cell of claim 1 wherein said first active material is formed into solid disk shaped layers having circular openings therethrough adapted to snuggly stack around each of said plurality of first electrically conductive tubes.

5. The electrochemical cell of claim 1 wherein said first active material comprising a granular transition metal chalogenide vibrated into the open volume intermediate individual first electrically conductive tubes within said cell container.

6. The electrochemical cell of claim 1 wherein said first active electrode material includes a solidified melt of alkali metal halides or alkaline earth metal halides uniformly filled with granular transition metal chalogenides.

7. The electrochemical cell of claim 1 wherein said electrochemically active material of first polarity includes FeS and said electrodes of opposite polarity each include an elongated pin of LiAl alloy with a second electrically conductive perforate tube outwardly concentric in electrical contact with said pin, lengthwise within each of said first tubes.

8. The electrochemical cell of claim 7 wherein said tubular layer of electrically insulative material is bonded to said second electrically conductive tube.

9. The electrochemical cell of claim 7 wherein said second electrically conductive tube is bonded to the outside surface of said pin of active material of opposite polarity.

10. The electrochemical cell of claim 7 wherein said first and second electrically conductive tubes having perforate walls are of carbon steel alloy.

11. The electrochemical cell of claim 1 wherein said electrochemically active material of first polarity includes LiAl and said electrochemically active material of opposite polarity includes $FeS_2$ and wherein each of said electrodes of opposite polarity include an elongated pin containing $FeS_2$ having an axial core of electrically conductive material.

12. The electrochemical cell of claim 11 wherein said first electrically conductive tubes are of carbon steel alloy and said longitudinal core of electrically conductive material includes molybdenum at least at the outer surfaces thereof.

* * * * *